April 11, 1950     C. J. CLARKE     2,503,801
CORN HOLDER
Filed May 17, 1946
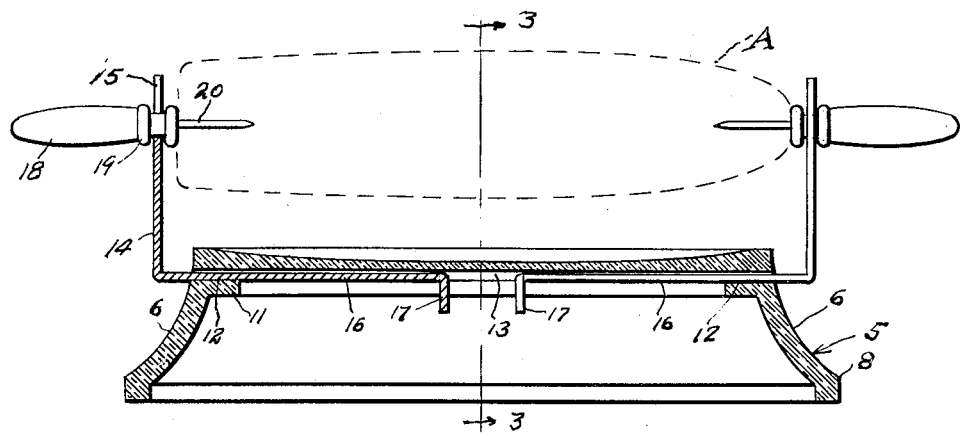
Fig-1-
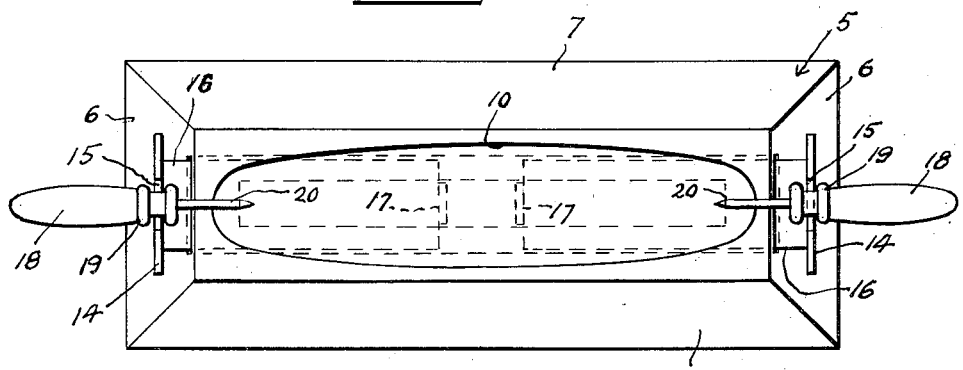
Fig-2-
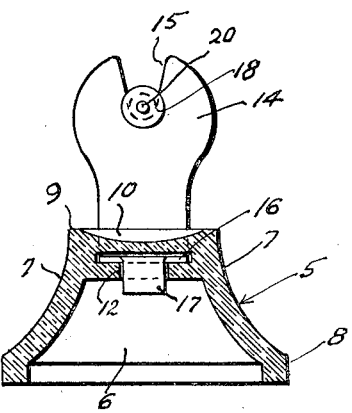
Fig-3-
INVENTOR.
Charles J. Clarke.
BY
Randolph & Beavers
attys.

Patented Apr. 11, 1950

2,503,801

UNITED STATES PATENT OFFICE 2,503,801

CORN HOLDER

Charles J. Clarke, Syracuse, N. Y.; The Merchants National Bank and Trust Company of Syracuse executor of said Charles J. Clarke, deceased Application May 17, 1946, Serial No. 670,375

1 Claims. (Cl. 294—5)

The present invention relates to corn holders such as are used for holding corn on the cob while eating.

The principal object of the invention is to provide corn on the ear holding means and a table stand for supporting the means and corn when not being held by the eater.

Another important object of the invention is to provide a corn holder, including a stand, which may be adjusted to accommodate ears of corn, varying in length.

A further object of the invention is to provide a holder of the character described above, constructed of but few parts and capable of being manufactured at low cost.

Still a further object of the invention is to provide a corn holder wherein the parts are positive in their relation to each other and constructed in such a manner as to be durable and not susceptible to the ready development of defects.

Various other important objects and advantages of the invention will become apparent to the reader of the following description.

In the drawing:

Figure 1 is a longitudinal vertical sectional view through the assembled structure;

Figure 2 is a top plan view of the assembly shown in Figure 1; and

Figure 3 is a cross-sectional view taken on line 3—3 of Figure 1.

Referring to the drawings, numeral 5 generally refers to a base, of a plastic, porcelain, glass or any other material found suitable and which is preferably made ornate by designs or scroll work along the sides thereof.

The base 5 may be constructed in various forms, that shown in the drawings being rectangular and having its end walls 6, 6 and its side walls 7, 7 preferably of concave shape, extending downwardly from the top of the base to a short vertical supporting wall 8 which can rest upon a table or other supporting surface.

The base has a top 9, preferably of integral construction with the side walls and the top has a concavity 10 to catch drippings from a supported ear of corn A.

At the upper portions of the end walls 6, 6 and the side walls 7, 7 the base has a thickened portion 11 which reinforces the base and through this thickened portion, at the end walls 6, 6 are slots 12, 12 merging with the ends of a longitudinal channel 13 which is formed in the bottom side of of the top 9.

Uprights 14, 14, bifurcated at their upper ends to define seats or notches 15, have horizontally disposed legs 16 with down turned free end portions or lugs 17, the legs 16 being slidably disposed through the slots 12, 12.

For handling the ear of corn A, a pair of handles 18, 18 is provided and each handle has a circumferentially grooved head 19 from which a corn piercing pin 20 projects.

In the use and operation of this ear corn supporting assembly, the uprights 14, 14 are pulled outwardly or pushed inwardly to a sufficient distance apart to receive a given length size ear of corn. (See Figure 1.)

The pins 20, 20 are now driven into the ends of the ear and the heads 19, 19 of the handles 18 allowed to settle down into the slots 15. In this operation a slight further adjustment of the uprights 14, 14 may be necessary, but this can be done by a slight effort of one finger of one or both hands against one or the other of the uprights.

It can now be seen, that with the uprights 14 properly adjusted, the ear of corn can be lifted by the handles 18 and eaten, and when desired, the handles can be lowered down over the uprights 14 so that the heads 19 will seat properly in the notches 15. The heads 19 seating on the rounded bottom portions of the notches 15 permit the ear A to be easily rotated, as when buttering or salting of the corn, and obviously any drippings from the corn will fall into the concavity 10 of the base top 9.

While the foregoing description, sets forth the invention in specific terms, it is to be understood that numerous changes in the shape, size and materials may be resorted to, without departing from the spirit and scope of the invention as claimed here and after.

Having described the invention what is claimed as new is:

An ear corn holder comprising a base having a top, a slot through the top and under the top surface thereof, said top having a slot in the bottom thereof opening into the first mentioned slot, a pair of L-shaped members having their leg portions disposed slidably into the first mentioned slot and having the free ends of said horizontal portions depending into the second mentioned slot to prevent rotation of the L-shaped members and ear corn piercing handle members supported by the upper ends of the L-shaped members.

CHARLES J. CLARKE.

REFERENCES CITED

The following references are of record in the file of this patent:

UNITED STATES PATENTS

| Number | Name | Date |
|---|---|---|
| 586,058 | Reardon | July 6, 1897 |
| 593,223 | Irmscher | Nov. 9, 1897 |
| 594,958 | Marschall et al. | Dec. 7, 1897 |
| 2,275,536 | Maisto | Mar. 10, 1943 |